(12) United States Patent  
Drummond (10) Patent No.: US 7,213,820 B2  
(45) Date of Patent: May 8, 2007

(54) MOBILE LOAD SUPPORT

(76) Inventor: David Carl Drummond, PO Box 282, Brookfield, Colchester County, Nova Scotia (CA) B0N 1C0

( * ) Notice: Subject to any disclaimer, the term of this patent is extended or adjusted under 35 U.S.C. 154(b) by 188 days.

(21) Appl. No.: 10/846,692

(22) Filed: May 17, 2004

(65) Prior Publication Data

US 2004/0227316 A1 Nov. 18, 2004

Related U.S. Application Data

(60) Provisional application No. 60/470,853, filed on May 16, 2003.

(51) Int. Cl.  
*B60P 1/00* (2006.01)

(52) U.S. Cl. .................. 280/79.11; 280/47.34

(58) Field of Classification Search ............ 280/79.11, 280/79.3, 79.4, 79.7, 79.6, 47.34, 47.41, 280/33.991, 651, 47.35

See application file for complete search history.

(56) References Cited

U.S. PATENT DOCUMENTS

| | | | | |
|---|---|---|---|---|
| 2,357,633 | A | * | 9/1944 | Cowgill, Jr. ............. 414/427 |
| 2,372,927 | A | * | 4/1945 | Berg ..................... 280/43.16 |
| 2,472,952 | A | * | 6/1949 | Lennard ..................... 280/35 |
| 2,789,828 | A | * | 4/1957 | Gary .......................... 280/35 |
| 4,066,272 | A | | 1/1978 | Cobb |
| 4,471,971 | A | * | 9/1984 | Keesler ................... 280/79.11 |
| 4,801,152 | A | * | 1/1989 | Elliott et al. ............. 280/47.34 |
| 5,044,645 | A | | 9/1991 | Eltvik |
| 5,112,070 | A | * | 5/1992 | Hahn ........................ 280/79.4 |
| 5,358,264 | A | | 10/1994 | Hewitt |
| 5,486,014 | A | * | 1/1996 | Hough .................... 280/79.11 |
| 5,599,031 | A | * | 2/1997 | Hodges ................... 280/79.11 |
| 5,620,192 | A | * | 4/1997 | Demongin ................... 280/35 |
| 6,095,746 | A | * | 8/2000 | Bergin ........................ 414/430 |
| 6,109,625 | A | * | 8/2000 | Hewitt .................... 280/43.24 |
| 6,880,837 | B2 | * | 4/2005 | Nandram et al. ........ 280/79.11 |

FOREIGN PATENT DOCUMENTS

| | | |
|---|---|---|
| CA | 634538 | 1/1962 |
| CA | 2323848 | 9/1999 |

* cited by examiner

*Primary Examiner*—Christopher Bottorff  
(74) *Attorney, Agent, or Firm*—Jones, Tullar & Cooper, P.C.

(57) ABSTRACT

A mobile load support for cradling and moving heavy loads comprises a pair of axles in spaced apart parallel relationship to each other, having corner units pivotally mounted on respective ends of the axles. Each of the corner units comprises a truck body having swivelable castor wheels disposed at each end thereof, and a platform projecting therefrom at a level below the longitudinal axis of the truck body for cradling a corner of the load. A pair of ratchet straps engages the ends of the axles, and can be tightened to secure the mobile load support around the load. The mobile load support is capable of manoeuvring over uneven surfaces due to the pivoting action of the corner units, which reduces the tendency of the load becoming dislodged from the support, and is flexible in that it can be easily adapted to loads of different sizes.

19 Claims, 9 Drawing Sheets

MOBILE LOAD SUPPORT

This application claims the benefit of U.S. provisional patent application No. 60/470,853 of May 16, 2003.

FIELD OF THE INVENTION

The present invention relates in general to movable supports, and more specifically to a mobile support structure for moving heavy loads such as machines.

BACKGROUND OF THE INVENTION

Traditionally, individual skates, dollies, castors or rollers have been used to support heavy equipment or machinery for movement thereof from one area to another. A roller is inserted under each corner of a machine, for example, in order to provide rolling support to facilitate the moving of the machine. Typically, the rollers raise the machine 4–6" off the ground, and the only connection provided between the machine and the rollers is the weight of the machine bearing down on the rollers. However, if the floor over which the machine is being moved is uneven, and should one of the rollers encounter a rut or protrusion in or on the surface, it is quite easy for one of the rollers to become dislodged from the load and for that corner of the machine to fall to the ground. When considering top-heavy machines, such a drop could result in the entire machine tipping over with disastrous results.

Various other mobile supports have been developed that include some type of frame that connects four corner rollers together in order to avoid the situation of having one of the corner rollers becoming dislodged from beneath the load. However, the structures are not easily adaptable to different sized loads since the frames consist of rigid members that are specifically fabricated to provide a certain low degree of adjustability, and they are usually cumbersome to adjust. Furthermore, the load is often raised a number of inches off the ground which still presents a hazard if the load were to become dislodged from one corner of the support.

Canadian Patent No. 2,323,848 to Hewitt discloses a mobile base assembly for supporting and moving machinery. The base assembly comprises corner members having platforms that support the load, extension members connecting the corner members together, support wheels and castor wheels, and at least two stops for supporting the base in a stationary position. The corner and extension members utilize a series of holes that are aligned with respect to each other, and then secured together using nuts and bolts. This allows the size of the base to be adjusted to accommodate a variety of load sizes. Although the base is adjustable, the use of nuts and bolts to join the corner and extension members together is cumbersome. Furthermore, the base is not easily adapted to accommodate extra support wheels or castors, which limits the load carrying capacity of the mobile base.

U.S. Pat. No. 5,044,645 to Eltvik teaches a U-shaped dolly apparatus for supporting and moving heavy objects. The device surrounds the intended load on three sides, with the weight of the load being supported by the two end members while the side member telescopes to adjust to the length of the load. The end members include large wheels, however the wheels do not pivot or swivel to allow for easy steering of the apparatus. Once again, adjustability is provided by means of specifically fabricated pieces that are aligned and locked together.

U.S. Pat. No. 5,358,264 to Hewitt reveals an I-shaped apparatus for supporting and moving heavy objects, typically machinery. The device essentially comprises two parallel end members connected by a centrally located longitudinal member creating the I-shape. One of the end members mounts a pair of pivoting castors, arranged at opposite ends thereof, while the other end member has a single centrally positioned swivelable wheel. The apparatus is of a fixed size and accordingly cannot be adjusted to fit different-sized loads.

U.S. Pat. No. 4,066,272 to Cobb discloses dolly means comprising individual units that have a frame with a supporting surface for engaging the heavy load, and four independent axles mounted beneath the surface with wheels rotatably mounted thereon. Each axle is capable of vertical movement, which allows one or both of its wheels to move up or down to respond to an uneven surface. The use of the dolly means, however, will often require more than one of the individual units with, for example, one of the units being placed under each corner of the load. Cobb's device improves upon the conventional use of skates or rollers by introducing independent axles beneath a single platform, which helps to reduce the likelihood of the device slipping out from beneath the load since the units can adjust to uneven surfaces. However, the possibility of one of the units becoming dislodged still exists as there is nothing holding each unit together in an overall assembly.

SUMMARY OF THE INVENTION

It has been found that incorporating pivoting movement to the wheel supports of a mobile load support or dolly, and that using flexible members to connect elements of the mobile load support or dolly together helps to alleviate some of the disadvantages and inconveniences previously encountered with prior art dollies.

Accordingly, the present invention seeks to provide a mobile load support apparatus comprising a pair of axles in spaced apart parallel relationship to each other and having corner units pivotally mounted on respective ends of the axles. Each of the corner units comprises an elongated body having wheels disposed at each end thereof, and a platform projecting therefrom at a level below the centre of the elongated body for cradling a corner of the load. Flexible linking means capable of engaging the ends of the axles, and including tensioning or tightening means, are provided to connect the axles together and secure the dolly apparatus around the load.

BRIEF DESCRIPTION OF THE DRAWINGS

The present invention will be better understood with reference to the detailed description taken in combination with the drawings in which.

DETAILED DESCRIPTION OF THE PREFERRED EMBODIMENTS

Figure 1:
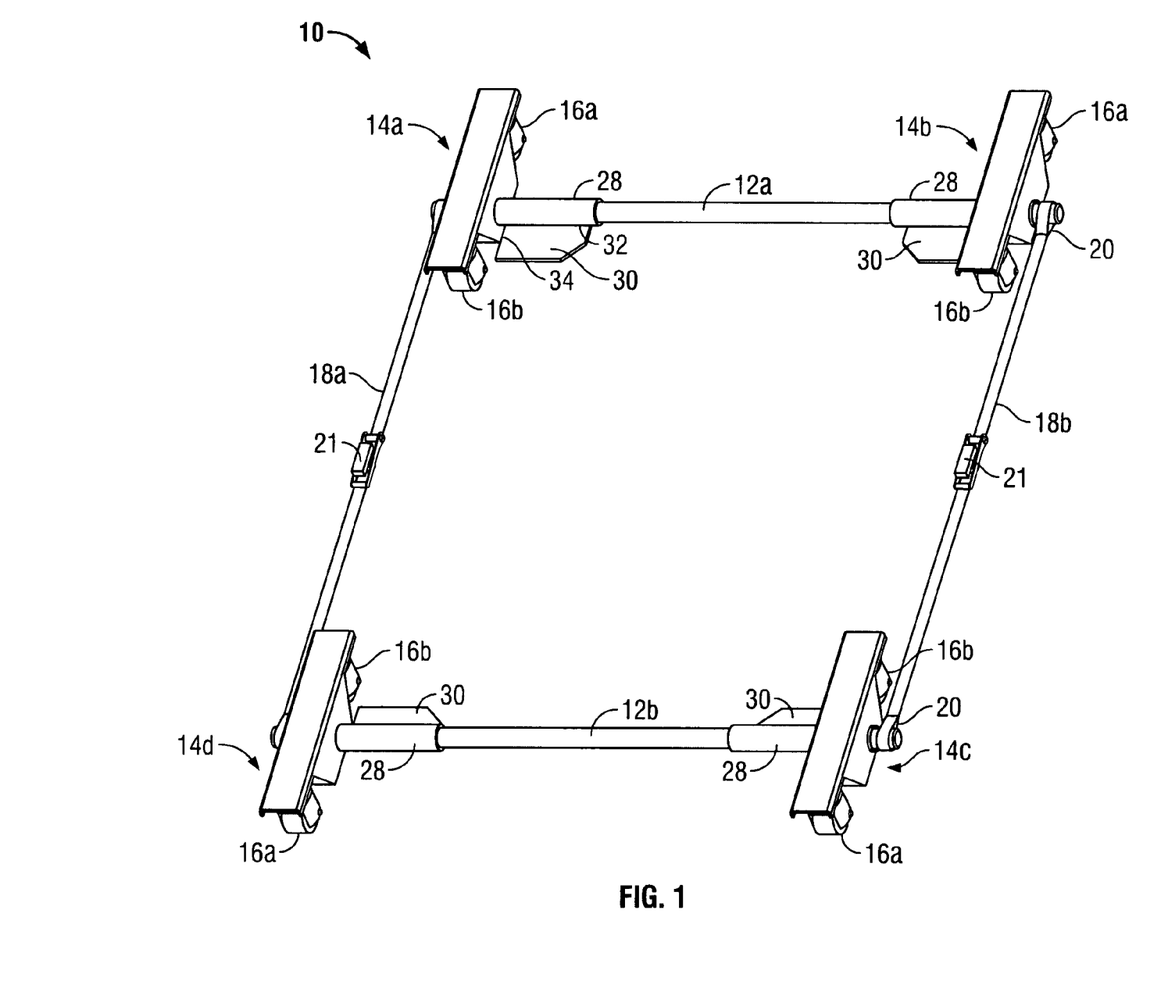
FIG. 1 is a top perspective view of the mobile load support according to the preferred embodiment of the present invention.

Referring to the drawings, there is shown in FIG. 1 the mobile load support or dolly apparatus 10 according to the present invention. According to the preferred embodiment, the mobile load support apparatus 10 utilizes a pair of axles 12a, 12b in spaced apart parallel relationship to each other, for positioning at respective forward and rearward ends of a load 11. Individual corner units 14a–d are provided for mounting to each of said axles adjacent each end thereof for supporting the load. Each of the load supporting corner units 14a–d is equipped with a pair of castor wheels 16a, 16b which provide for easy movement of the mobile load support apparatus 10 in any direction along the ground as they are rotatably connected to the corner units 14a–d for swivelable movement with respect thereto. Ratchet straps 18a, 18b serve as flexible linking means to connect the axles together in their spaced apart relationship about the load 11 and impose a tension load thereon to draw the forward and rearward axles together. Each of the ratchet straps 18a, 18b has a loop 20 at each end thereof for receiving a respective end of the axles 12a, 12b, and can be adjusted in length to suit the size of the load 11. When the straps 18a, 18b have engaged the ends of the axles, the straps 18a, 18b are tensioned or tightened using a ratchet mechanism 21 to ensure that the mobile load support apparatus 10 is secured around the load 11. The straps 18a, 18b may be made of any suitable material that provides the required strength such as polypropylene or high quality polyester. This material not only provides adequate strength for the webbing of the straps, but it also helps to eliminate stretching of the webbing while the straps 18a, 18b are being tightened.

Any conventional ratchet mechanism 21 may be used to tighten the straps 18a, 18b. Typically, ratchet mechanisms comprise a toothed wheel on which a pawl rests, and an actuating lever for operating the ratchet. The lever operates between a locked closed position wherein the strap tension is maintained and a locked open position which releases the tension load on the strap and allows the strap to be freely pulled in the non-tensioning direction. The operation of the lever between these two positions results in tightening of the strap. The pawl is positioned so that it can move over the teeth of the ratchet; however, once the actuating lever is in the locked closed position, the pawl engages the teeth of the ratchet thereby preventing movement of the strap in the non-tensioning direction.

Figure 2A:
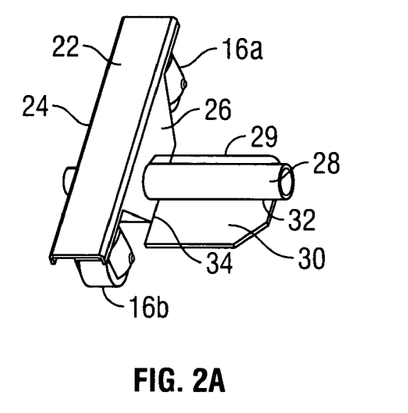
FIG. 2a is a detailed top perspective view of a corner unit utilized with the preferred embodiment of the present invention.
Figure 2B:
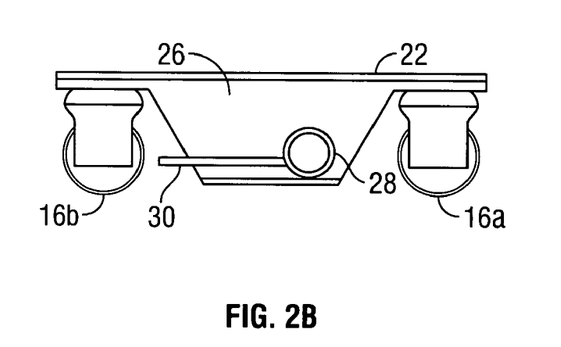
FIG. 2b is an inside side elevation view of a corner unit utilized with the preferred embodiment of the present invention.
Figure 3:
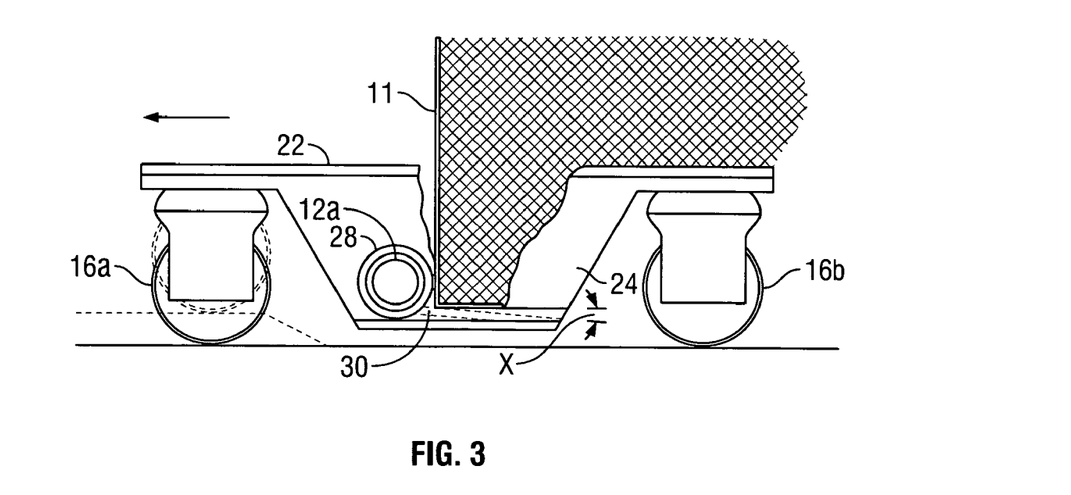
FIG. 3 is an enlarged, partially cut away, side elevational view of a corner unit utilized with the preferred embodiment of the present invention and with a load in place showing the pivoting movement of the corner unit.

As shown in FIGS. 2a, 2b and 3, each corner unit is comprised of an elongated body or truck body 22 having an outer face 24 facing away from the load 11 and an inner face 26 adjacent the load 11. The castor wheels 16a, 16b are disposed at each end of the elongated body 22. Castor wheels 16a, 16b are mounted to the body 22 in a conventional manner so that they can swivel about a vertical axis. A mounting tube 28 extends from the outer face 24 of the truck body 22 through the thickness thereof, and projects transversely beyond the inner face 26 of the truck body 22, creating a projecting portion 29. A load supporting platform 30 for cradling a corner of the load 11 is connected at one edge 32 thereof, as by welding, along the length of the projecting portion 29 of the mounting tube 28, and along an adjacent edge 34 to the inner face 26 of the truck body 22. The platform 30 is connected to the projecting portion 29 of the mounting tube 28 near the lowermost part of the-mounting tube 28. Therefore, the platform 30 is positioned below the longitudinal axis of the mounting tube 28. When the load 11 is placed on the mobile load support apparatus 10, the positioning of the platform 30 on each of the corner units 14a–d allows the load 11 to be cradled at a level lower than the longitudinal axis of the mounting tube 28 and the longitudinal axis of the truck body 22. As a result, the load 11 is raised no more than about an inch off the ground; therefore the load 11 and the mobile load support apparatus 10 together, will have a relatively low centre of gravity. This contributes to the stability of the load 11 on the mobile load support apparatus 10 since the tendency of the load 11 to tip is reduced. Furthermore, even if the load becomes dislodged from the mobile load support apparatus 10 or if the mobile load support apparatus 10 fails, the amount of damage would be minimal since the drop would only be about an inch.

Once the load 11 is placed on the mobile load support apparatus 10 and the ratchet straps 18a, 18b have been tightened, the load 11 can easily be transported in any direction due to the swivelling ability of the castor wheels 16a, 16b. The structure and mounting of the corner units 14a–d also contribute to the ease with which the load 11 can be transported since the corner units 14a–d can pivot about their respective axles 12a, 12b. As a result of the pivoting movement of the corner units 14a–d, when the mobile load support apparatus 10 encounters slight discrepancies in the level of the ground or floor such as small objects, a change in floor surface or just the general unevenness that is common of workshop or warehouse floors, the corner units 14a–d are able to accommodate the changes in the surface. This further reduces the tendency of the load 11 to become dislodged from the mobile load support apparatus 10 since the likelihood of one or more of the corner units 14a–d stopping abruptly as they encounter small obstacles on the floor is reduced.

As shown in FIG. 3, when the mobile load support apparatus 10 encounters a slight incline on the floor surface for example, the corner unit 14a will pivot and adjust to the incline. The front castor wheel 16a will maintain contact with the ground and will be followed by the rear castor wheel 16b. The pivoting movement of the corner unit 14a will result in movement of the platform 30 with respect to the load 11, indicated by X in FIG. 3. However, the distance created between the load 11 and the platform 30 is very small so as not to de-stabilize the load 11 on the mobile load support apparatus 10.

Figure 4:
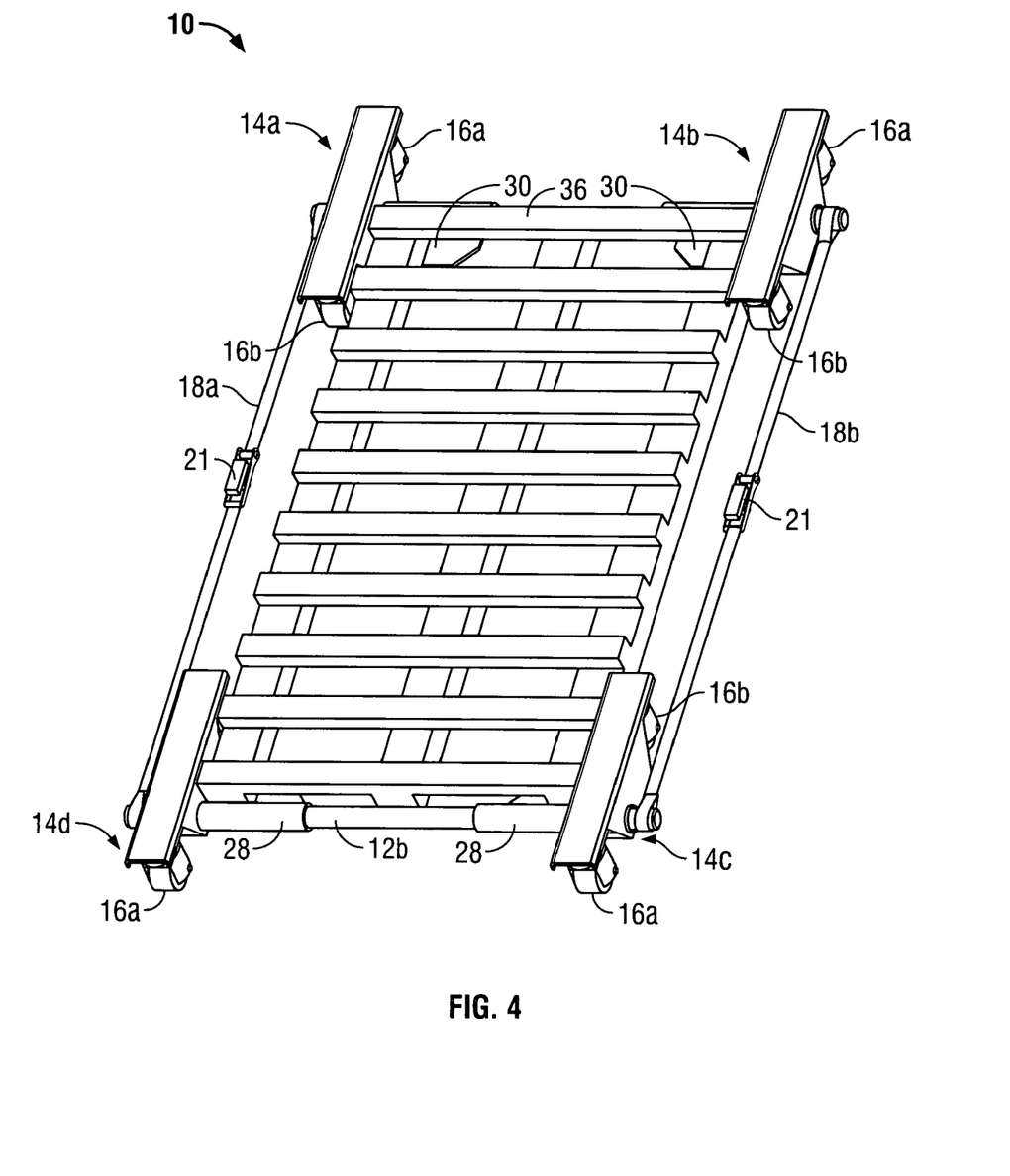
FIG. 4 is a top perspective view of the mobile load support according to the preferred embodiment of the invention in use with a pallet.

The mobile load support apparatus 10 is mainly adapted for use with square or rectangular shaped objects. It is especially suitable for moving production machinery in a shop or for moving pallets in a warehouse, and may even be used for mounting and moving wheeled vehicles such as cars or trucks. However, other differently shaped objects may also be transported using the dolly apparatus 10 by first placing the load 11 on a square or rectangular pallet 36, which can then be used with the mobile load support apparatus 10, as shown in FIG. 4. The mobile load support apparatus 10 of the present invention is also versatile since, because the corner units 14a–d of the dolly 10 are free sliding along the length of the axles 12a, 12b, they can be easily adjusted to suit the width of the specific load 11 being transported. The mobile load support apparatus 10 is further adaptable since axles 12a, 12b of various lengths may be used, provided they are appropriately sized to receive the corner units 14a–d, which also helps to accommodate different sized loads 11. Therefore, the free-sliding of the corner units 14a–d, the ability to use axles 12a, 12b of different lengths, and the use of adjustable straps all contribute to the flexibility of the mobile load support apparatus 10 and the ease with which it can be adapted to accommodate loads of different sizes.

Figure 5:
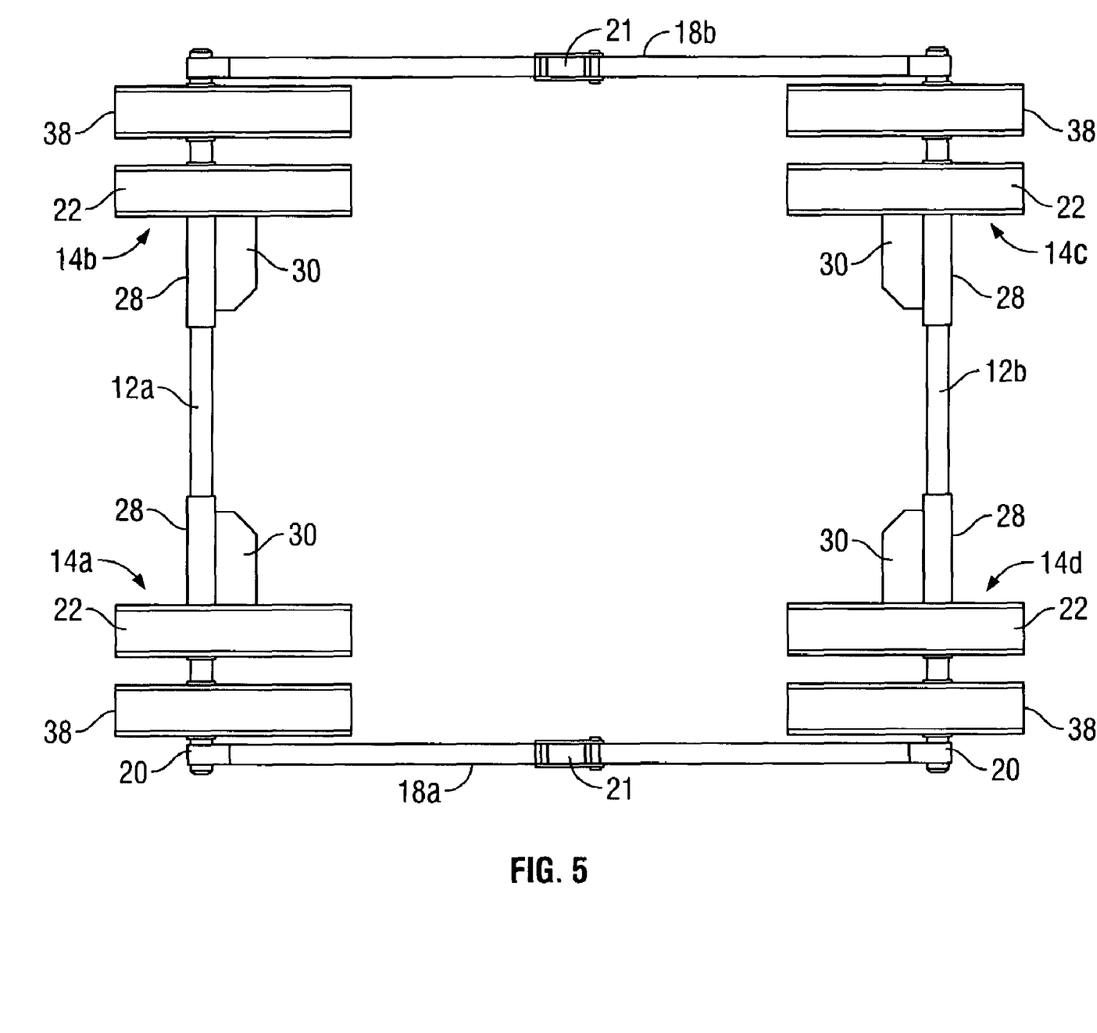
FIG. 5 is a top view of the mobile load support according to an embodiment of the present invention with extra supports.

The mobile load support apparatus 10 may also be equipped with additional corner units that act as support units 38 which can increase the load-carrying capacity of the device. The support units 38 may be the same as the primary corner units 14a–d or they may have a slightly different structure that does not include a platform 30. The mobile load support apparatus 10 utilizing additional support units 38 (without platforms 30) is shown in FIG. 5.

Figure 6:
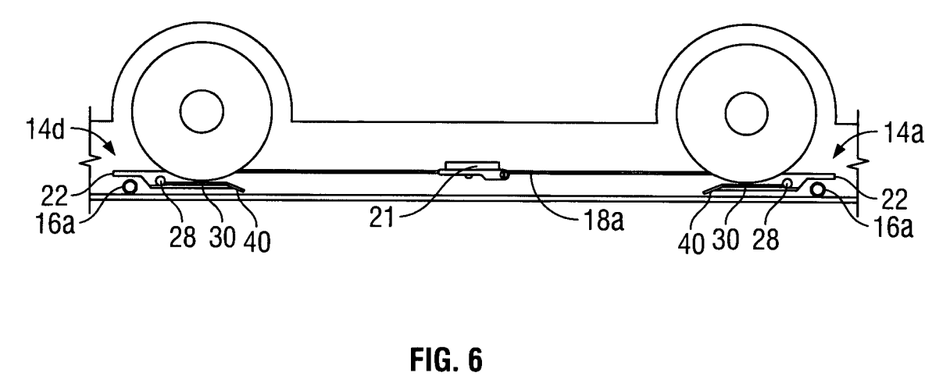
FIG. 6 is an interior side elevational view of the mobile load support for carrying a wheeled vehicle according to an embodiment of the present invention.

In another embodiment of the invention, the corner units 14a–d may be adapted to be more suited for carrying wheeled vehicles, as shown in FIG. 6. In such an embodiment the mounting tube 28 on each of the corner units 14a–d has a projecting portion 29 of a length that is greater than the width of the tire of a vehicle, and the truck body 22 and platform 30 are sized appropriately as well. As shown in more detail in FIG. 7, the platform 30 is adapted to have a slightly bevelled or bent leading edge 40. The bevelled leading edge 40 facilitates loading the wheeled vehicle on to the mobile load support 10 since the slight incline created by the bevel tends to urge the wheels of the vehicle on to the platform 30.

Figure 7:
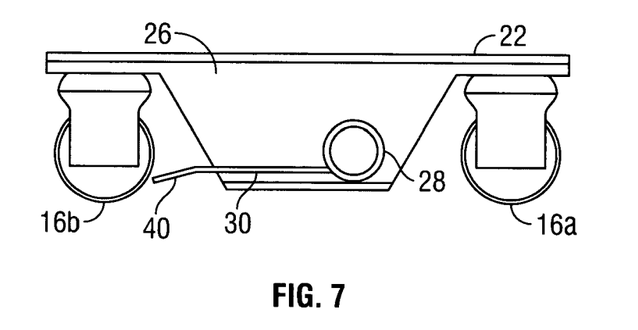
FIG. 7 is a detail side view of a corner unit according to the embodiment of FIG. 6.

When loading a wheeled vehicle on to the mobile load support 10, axles 12a, 12b with the corner units 14a–d mounted thereon are placed at the front and rear of the vehicle with the bevelled leading edge 40 of the platform 30 of each of the corner units 14a–d adjacent the tires of the vehicle, which has been placed in neutral. The straps 18a, 18b are then connected to each of the axles 12a, 12b, and are then tightened, causing the platform 30 of each of the corner units 14a–d to be wedged further under the tires of the vehicle until the vehicle is properly supported on the mobile load support 10 and ready for transport.

Figure 8:
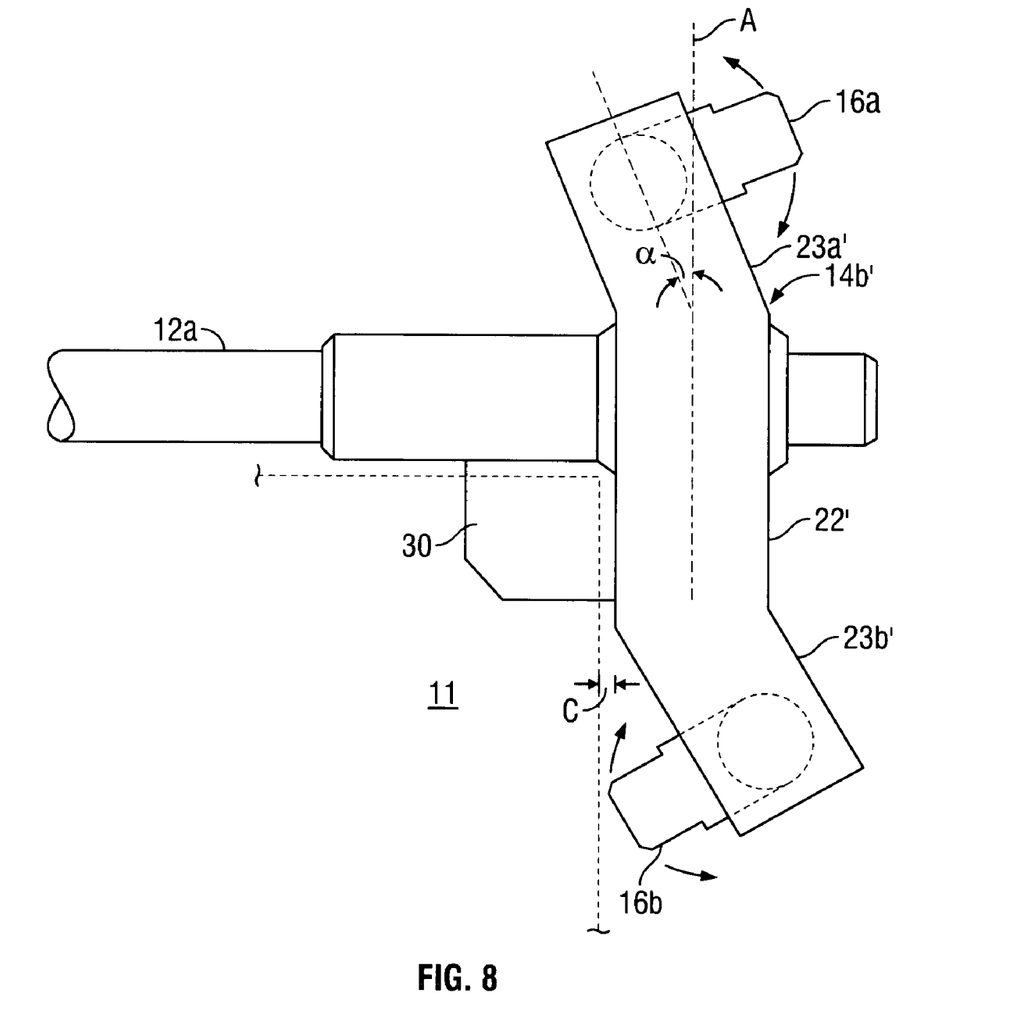
FIG. 8 is a top view of another embodiment of the corner unit for use in the mobile load support apparatus.

According to another embodiment of the invention (see FIGS. 8 and 9), the mobile load support apparatus 10 may include forward and rearward sets of corner units 14a–d' that are structured so that the ends 23a', 23b' of the elongated body 22' of the corner units are offset with respect to the longitudinal axis A thereof by an angle α. The end 23a' of the forward set of corner units 14a', 14b' that is most distal to the load 11 is angled in a direction toward the load, while the end 23b' of the corner units 14a', 14b' that is most proximal to the load 11 is angled in a direction away from the load. The rearward set of corner units 14c', 14d' are structured so that they are the mirror image of the forward set or reversed relative thereto. Therefore, the end 23a' of the corner units 14c', 14d' that is most distal to the load 11 is angled in a direction toward the load 11, while the end 23b' that is most proximal to the load 11 is angled in a direction away from the load 11. The offset creates additional clearance C to accommodate the 360° swivelling movement of the castor wheels 16a, 16b and helps to avoid unwanted interference between the castor wheels 16a, 16b and the load 11. The offset that is created is typically in the range of 15° to 20° with respect to the longitudinal axis of the elongated body 22'.

Figure 9:
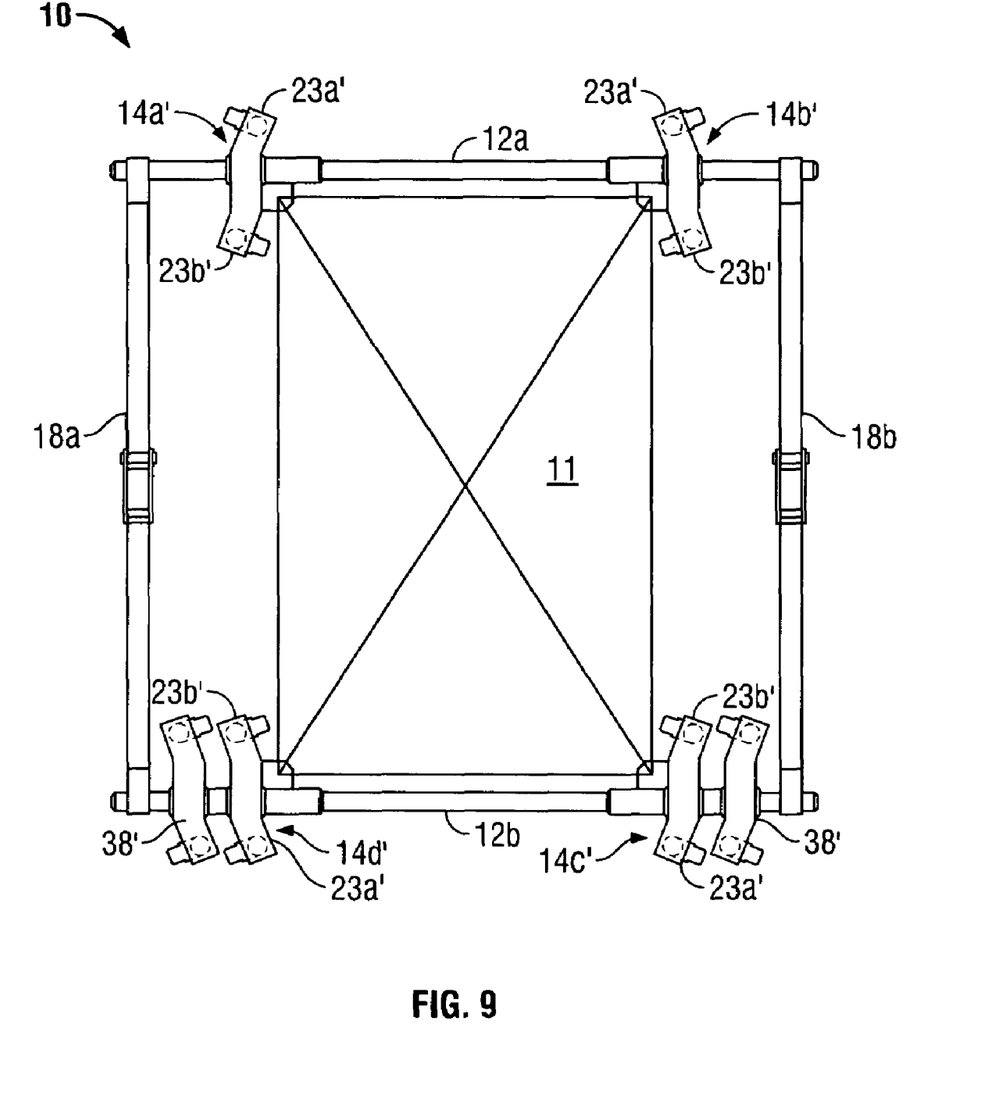
FIG. 9 is a top view of the mobile load support apparatus utilizing the corner unit of FIG. 8.

As can be seen in FIG. 9, additional support units 38' may also be used when the mobile load support apparatus 10 is equipped with the offset corner units 14a–d'. Once again, the additional support units 38' do not need to include a platform 30 and they may be used in conjunction with only one set of corner units, as shown in FIG. 9 wherein they are used with the rearward set of corner units 14a', 14b'.

Figure 10:
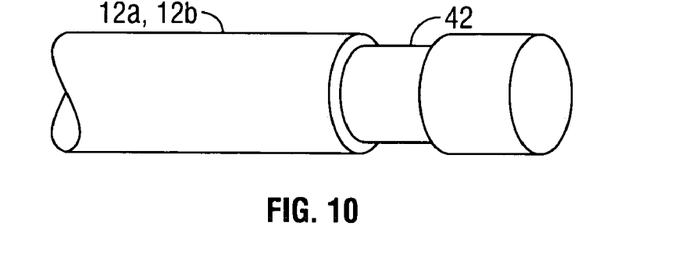
FIG. 10 is a detail view of the end of an axle according to an embodiment of the invention.
Figure 11:
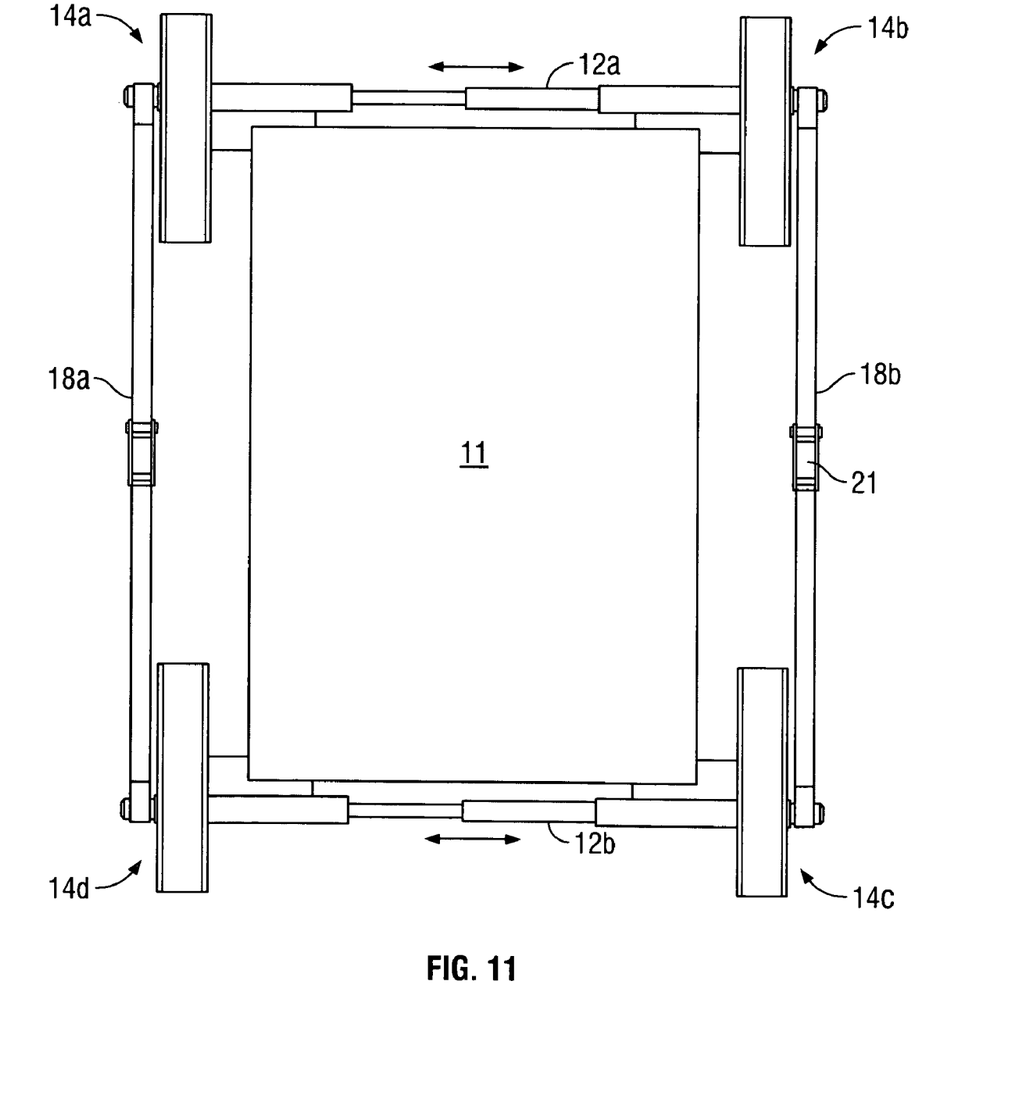
FIG. 11 is a top view of the mobile load apparatus wherein the axles are telescoping members.

While the mobile load support or dolly apparatus of the present invention has been described in reference to the preferred embodiments, it will be understood by those skilled in the art that variations may be incorporated into the mobile load support apparatus 10 without departing from the scope of the invention. For instance, the axles 12a, 12b may be made of metal tubes or solid rods of any suitable material, and may have grooves 42 formed around their outer circumference adjacent the ends thereof for receiving the flexible linking means. The grooves 42 help to ensure that the straps 18a, 18b remain in position around the ends of the axles 12a, 12b as shown in FIG. 10. As well, the axles 12a, 12b may be made of telescoping tubes to provide additional adjustability rather than using tubes or rods of different lengths (see FIG. 11).

Figure 12A:
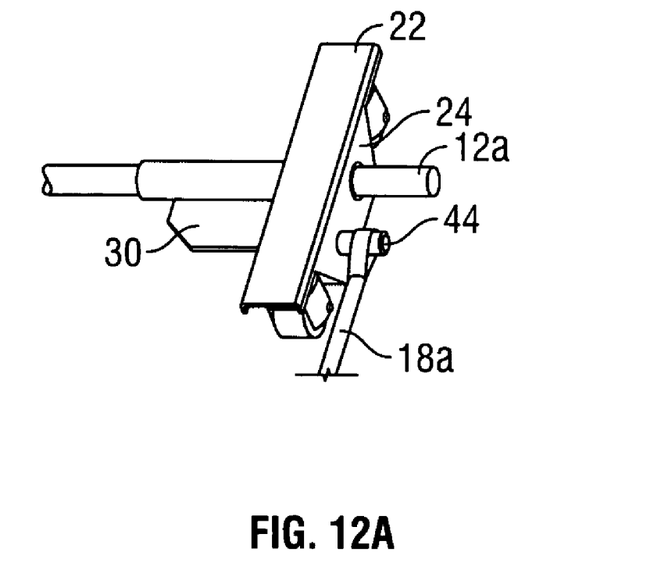
FIGS. 12a and 12b are detailed top perspective views of a corner of the mobile load support apparatus showing alternate connections for the flexible linking means.
Figure 12B:
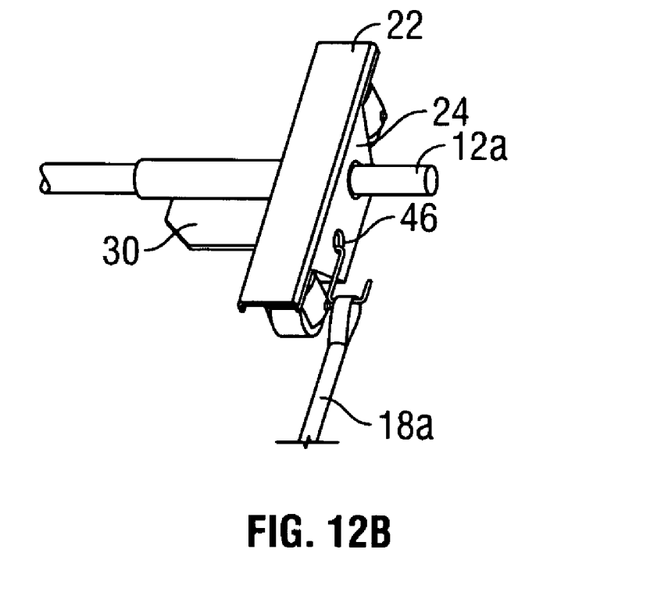

The preferred embodiment has also been described as using ratchet straps 18a, 18b to hold the axles 12a, 12b in spaced apart parallel relationship with respect to the load 11. However, the axles 12a, 12b may be connected using any suitable flexible linking means capable of securing the dolly apparatus 10 with respect to the load 11. The straps 18a, 18b do not necessarily need to be of the ratcheting type provided they are equipped with any other suitable means for tightening the straps, for example a buckle or any equivalent that allows the length of the strap to be adjusted. Furthermore, the straps do not need to be connected to the axles 12a, 12b by loops 20 on their respective ends. Any other suitable means for attaching the straps 18a, 18b to the axles may be used, such as hooks that are capable of grasping the ends of the axles. As well, the straps 18a, 18b do not need to engage the ends of the axles 12a, 12b provided suitable means for receiving the engaging ends of the straps 18a, 18b are provided on the load supporting corner units 14a–d. For instance, the outer face 24 of the corner units 14a–d may be provided with a projection 44 for receiving the loops or hooks of the engaging ends of the straps 18a, 18b, as shown in FIG. 12a. Alternatively, when the engaging means at the ends of the straps 18a, 18b are hooks, the corner units 14a–d may be provided with an engaging hole 46 in either the outer face 24 or top of the elongated body 22 for receiving the hooks and thereby securing the mobile load support apparatus around the load 11, as shown in FIG. 12b. When the corner units 14a–d' with the offset ends are used, the engaging hole 46 is positioned on the top surface of the elongated body 22 to facilitate engagement with the straps 18a, 18b.

Therefore, it will be well understood by those skilled in the art that the mobile load support 10 of the present application has numerous applications and should not be limited to those described herein.

The invention claimed is:

1. A mobile load support apparatus for moving a load, comprising:
   a pair of axles positionable in spaced apart parallel relationship to one another at respective forward and rearward ends of said load;
   at least one corner unit including an elongated body pivotally mounted on each of said axles adjacent each end thereof, and including a platform projecting from said elongated body perpendicular to and below the longitudinal axis thereof for supporting said load;
   at least two swivelable castor wheels connected to each corner unit, at least one at each end of said elongated body, for providing rolling movement to said apparatus; and
   a pair of flexible tightenable straps, one for each side of said apparatus, engageable with either the respective ends of said axles or said corner units, for connecting said axles in said spaced apart parallel relationship around said load.

2. The mobile load support apparatus as claimed in claim 1, wherein said straps are adjustable in length to suit the size of said load.

3. The mobile load support apparatus as claimed in claim 2, wherein said corner units are free-sliding along the length of said axles.

4. The mobile load support apparatus as claimed in claim 3, wherein the ends of said elongated body that are the most distal to said load are offset with respect to the longitudinal axis of said elongated body in a direction towards said load; and the ends of said elongated body that are the most proximal to said load are offset with respect to the longitudinal axis of said elongated body in a direction away from said load.

5. The mobile load support apparatus as claimed in claim 4, wherein said ends are offset by an angle of between 15°–20°.

6. The mobile load support apparatus as claimed in claim 2, wherein said straps include loops which can be slipped over the ends of said axles.

7. The mobile load support apparatus as claimed in claim 2, wherein said straps are ratchet straps.

8. The mobile load support apparatus as claimed in claim 1, further including:
   a support unit positionable on said axles adjacent and outboard of each said corner unit, each said support unit comprising:
   an elongated body pivotally mounted on the axle; and
   at least one swivelable castor wheel disposed at each end of said elongated body for
   providing rolling movement to said apparatus.

9. The mobile load support apparatus as claimed in claim 8, wherein each said elongated body is mounted on said axle by a mounting tube extending through the thickness of said body and projecting beyond a lateral side thereof, said mounting tube having a diameter slightly larger than the diameter of said axles to permit sliding and pivoting movement therebetween.

10. The mobile load support apparatus as claimed in claim 9, wherein said platform abuts and is secured to said mounting tube along an edge of said platform.

11. The mobile load support apparatus as claimed in claim 10, wherein said platform includes a sloped leading edge to facilitate the positioning of the load thereon.

12. A corner unit for use with a mobile load support apparatus, comprising:
   an elongated body member having an outer face, an inner face and, at each end thereof, a castor wheel rotatably mounted to said body member for swivelable movement about a generally vertical axis;
   an elongated hollow cylindrical tube member extending through said body member normal to said outer and inner faces and a longitudinal axis of said body member, a major portion of said tube member projecting beyond said inner face;
   said tube member being sized for receiving a cylindrical axle of said apparatus such that said tube member can slide on said axle and can pivot relative thereto; and
   a load supporting platform member secured to said major portion of said tube member and to said inner face of said body member below and parallel to a central axis of said tube member.

13. A mobile load support apparatus for moving a load, said apparatus comprising:
   (a) a pair of elongated axles for positioning at respective forward and rearward ends of said load;
   (b) a load supporting corner unit for mounting to each end of said axles adjacent each end of each said axle;
   (c) each said load supporting corner unit comprising:
      (i) an elongated body member having an outer face, an inner face and, at each end thereof, a castor wheel rotatably mounted to said body member for swivelable movement about a generally vertical axis;
      (ii) an elongated hollow cylindrical tube member extending through said body member normal to said outer and inner faces and a longitudinal axis of said body member, a major portion of said tube member projecting beyond said inner face;
      (iii) said tube member being sized for receiving one of the axles of said apparatus such that said tube member can slide on said axle and can pivot relative thereto; and
      (iv) a load supporting platform member secured to said major portion of said tube member and to said inner face of said body member below and parallel to a central axis of said tube member; and
   (d) on each side of said apparatus, a flexible tightenable strap connecting respective ends of the axles at the forward and rearward ends of the load and imposing a tension load tending to draw said forward and rearward axles together.

14. The mobile load support apparatus as claimed in claim 13, further including a rectilinear pallet member, wherein said pallet member may be carried by said load supporting corner units and said load may be supported on said pallet member.

15. The mobile load support apparatus as claimed in claim 13, further comprising a groove formed around each end of said axles for receiving said flexible linking means.

16. The mobile load support apparatus as claimed in claim 13, wherein said axles are telescoping members.

17. A mobile load support apparatus for moving a load, comprising:
   a pair of axles positionable in spaced apart parallel relationship to one another at respective forward and rearward ends of said load;
   at least one corner unit including an elongated body pivotally mounted on each of said axles adjacent each end thereof, and including a platform projecting from said elongated body perpendicular to and below the longitudinal axis thereof for supporting said load, each said corner unit being free-slidable along the length of the axle;

at least two swivelable castor wheels connected to each corner unit, at least one at each end of said elongated body, for providing rolling movement to said apparatus;

a pair of flexible tightenable straps, adjustable in length, one for each side of said apparatus, engageable with one of the ends of said axles and said corner units, for connecting said axles in said spaced apart parallel relationship around said load; and the ends of said elongated body that are the most distal to said load being offset with respect to the longitudinal axis of said elongated body in a direction towards said load; and the ends of said elongated body that are the most proximal to said load being offset with respect to the longitudinal axis of said elongated body in a direction away from said load.

18. The mobile load support apparatus as claimed in claim 17, wherein said ends are offset by an angle of between 15°-20°.

19. A mobile load support apparatus for moving a load, comprising:

a pair of axles positionable in spaced apart parallel relationship to one another at respective forward and rearward ends of said load;

at least one corner unit including an elongated body pivotally mounted on each of said axles adjacent each end thereof, and including a platform projecting from said elongated body perpendicular to and below the longitudinal axis thereof for supporting said load;

at least two swivelable castor wheels connected to each corner unit, at least one at each end of said elongated body, for providing rolling movement to said apparatus;

a pair of flexible tightenable straps, one for each side of said apparatus, engageable with one of the ends of said axles and said corner units, for connecting said axles in said spaced apart parallel relationship around said load;

each said elongated body being mounted on said axle by a mounting tube extending through the thickness of said body and projecting beyond a lateral side thereof, said mounting tube having a diameter slightly larger than the diameter of said axle to permit sliding and pivoting movement therebetween; and said platform abutting and being secured to said mounting tube along an edge of said platform.

* * * * *